United States Patent [19]

Matsutani

[11] Patent Number: 5,479,406
[45] Date of Patent: Dec. 26, 1995

[54] DATA COMMUNICATION SYSTEM AND METHOD

[75] Inventor: Mika Matsutani, Tokyo, Japan

[73] Assignee: NEC Corporation, Tokyo, Japan

[21] Appl. No.: 313,791

[22] Filed: Sep. 28, 1994

[30] Foreign Application Priority Data

Sep. 28, 1993 [JP] Japan .................................. 5-240828

[51] Int. Cl.$^6$ ................................................. H04L 12/403
[52] U.S. Cl. ..................................... 370/85.8; 340/825.08
[58] Field of Search ........................... 370/85.1, 13, 85.2,
370/118, 85.8, 65.7, 85.9, 92, 93, 85.6,
95.1, 60, 60.1, 94.1, 94.2, 16, 95.2; 340/825.08,
825.5, 825.01, 825.02, 825.03; 371/32,
33; 375/240; 348/384

[56] References Cited

U.S. PATENT DOCUMENTS

| | | | |
|---|---|---|---|
| 5,161,151 | 11/1992 | Kimura et al. | 370/85.8 |
| 5,272,702 | 12/1993 | Snowbarger et al. | 370/85.8 |

FOREIGN PATENT DOCUMENTS

| | | |
|---|---|---|
| 1-293729 | 11/1989 | Japan . |
| 1-276263 | 11/1989 | Japan . |
| 4-268847 | 9/1992 | Japan . |

*Primary Examiner*—Benedict V. Safourek
*Assistant Examiner*—Dang Ton
*Attorney, Agent, or Firm*—Whitham, Curtis, Whitham & McGinn

[57] ABSTRACT

A data communication system is constituted by a master station and slave stations for communicating data with the master station. The slave station includes a memory and a response control section. The memory stores flag data indicating whether the contents of a plurality of data managed by the home station have changed. The response control section transmits the data flag stored in the memory as response data when a command flag included in command data from the master station designates transmission of the data flag, and transmits the designated data as response data when a command flag included in command data from the master station designates transmission of the data managed by the home station. The master station includes a command control section for transmitting command data including a command flag for designating transmission of a data flag at first, and retransmitting command data including a command flag for designating transmission of the data managed by the slave station to the slave station which has transmitted response data including a data flag indicating a change in the data only when the data flag included in the response data from the slave station in response to the command data indicates that the data managed by the slave station have changed. A data communication method is also disclosed.

8 Claims, 4 Drawing Sheets

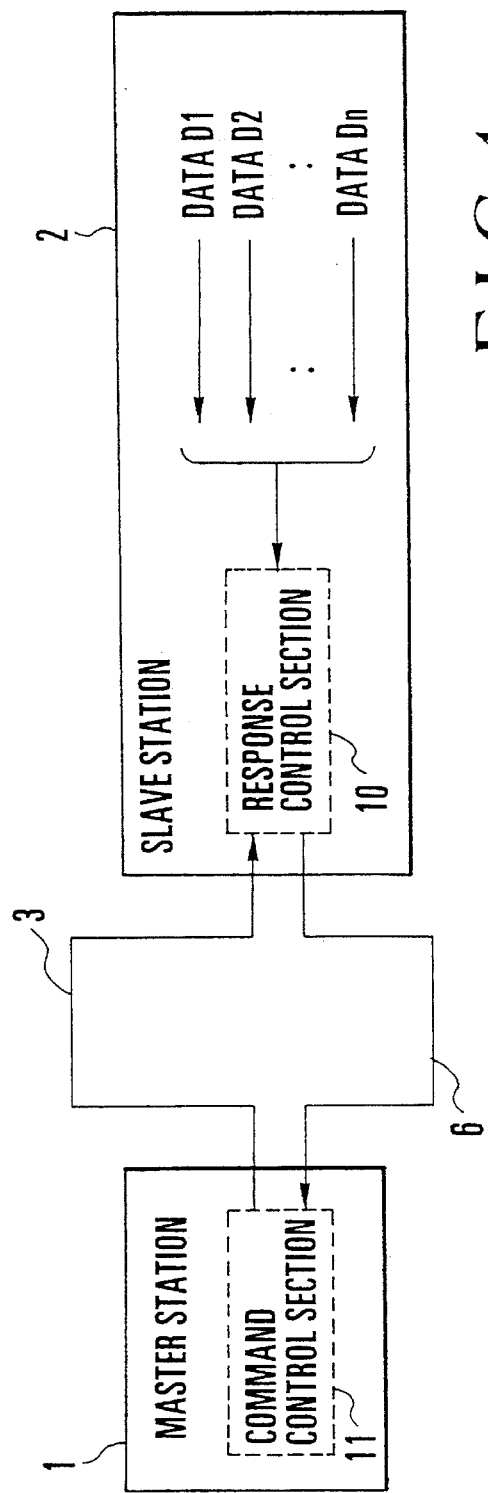
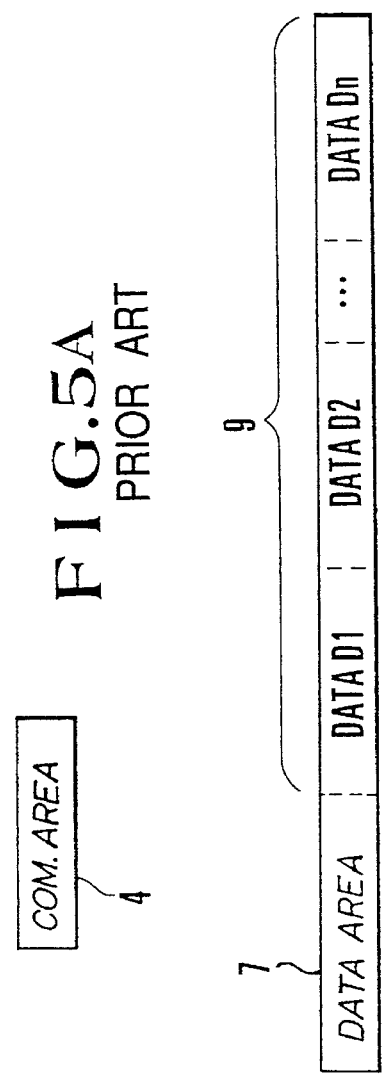
FIG. 4 PRIOR ART
FIG. 5A PRIOR ART
FIG. 5B PRIOR ART

DATA COMMUNICATION SYSTEM AND METHOD

BACKGROUND OF THE INVENTION

The present invention relates to a data communication system and method for data communication between a master station for transmitting commands and receiving responses and slave stations for receiving commands and transmitting responses and, more particularly, to a data communication system and method applied to a case wherein each slave station has a large amount of data, and the contents of the data need to be exchanged only when the contents of the data change, but need not be exchanged in a normal operation.

FIGS. 4, 5A, and 5B show the arrangement of a conventional data communication system and method for data communication between one master station and a plurality of slave stations. The system and method are designed to exchange command data transmitted from the master station to each slave station, and response data transmitted from each slave station to the master station in response to the command data.

In the data communication system shown in FIG. 4, reference numeral 1 denotes a master station including a command control section 11 and designed to transmit command data 3 and receive response data 6; and 2, a slave station including a response control section 10 and designed to transmit a plurality of data D1 to Dn through response data 6 in response to the command data 3. As shown in FIG. 5A, the command data 3 is constituted by a command area 4 in which the identification information of the slave station 2 as a transmission source is set. As shown in FIG. 5B, the response data 6 is constituted by a response data area 7 in which the identification information of the slave station 2 as a transmission source is set, and a data area 9 in which data D1 to Dn are stored.

FIG. 6 shows a sequence of data communication between the master station 1 and the slave station 2 in FIG. 4. The conventional data communication method will be described below with reference to FIG. 6.

Assume that the master station 1 wants to know changes in the data D1 to Dn held by the slave station 2. In this case, in accordance with an instruction from a host control section (not shown) in the master station 1, the command control section 11 transmits command data 41 having the identification information of the slave station 2 stored in the command area 4 to the slave station 2 (step S21).

In response to the command data 41 (step S22), the slave station 2 reads out the data D1 to Dn (step S23), stores the data in the data area 9 and the identification information of the slave station 2 in the response data area 7, and transmits the data as response data 42 (step S24).

The master station 1 receives the response data 42 from the slave station 2 (step S25), reads out all the data D1 to Dn from the data area 9, and stores the data (step S26). Thereafter, the master station 1 compares these latest data with all the data D1 to Dn previously received from the slave station 2, and informs the host control section in the master station 1 of the comparison result (step S27). With this operation, the master station 1 can check changes in the data D1 to Dn in the slave station 2.

Subsequently, the master station 1 checks changes in data held by another station by the same procedure as described above (step S28). After checking processing with respect to each slave station is completed, changes in the data D1 to Dn in the slave station 2 are checked by using command data 43 and response data 44 (steps S29 to S35). Subsequently, data change checking processing is repeatedly performed with respect to each slave station by the same procedure as described above (step S36).

In such a conventional data communication method and system, all the data held by each slave station are read out and transmitted, as response data, to the master station for every checking operation even in a case wherein each slave station has a large amount of data, and the contents of the data need to be known only when the data change, but need not be known in a normal operation. With this operation, since each slave station transmits a large amount of data, a deterioration in transmission efficiency occurs. In addition, the master station reads out all the data received from each station and checks the state of each station by checking changes in data by comparison processing. Therefore, the load on the master station is heavy.

SUMMARY OF THE INVENTION

It is an object of the present invention to provide a data communication system and method which are designed to reduce the amount of communication data transmitted from slave stations to check changes in state.

It is another object of the present invention to provide a data communication system and method which are designed to reduce the processing load on a master station.

In order to achieve the above objects, according to the present invention, there is provided a data communication system, constituted by a master station and a plurality of slave stations for transmitting/receiving data to/from the master station, for causing the master station to transmit command data to each of the slave stations and causing the slave station to transmit response data in response to the command data, the slave station including a memory for storing flag data indicating whether contents of a plurality of data managed by a home station have changed, and response control means for, when a command flag included in command data from the master station designates transmission of a data flag, transmitting the data flag stored in the memory as response data, and for, when a command flag included in command data from the master station designates transmission of a plurality of data managed by the home station, transmitting the plurality of designated data as response data, and the master station including command control means for transmitting command data including a command flag for designating transmission of a data flag at first, and retransmitting command data including a command flag for designating transmission of the plurality of data managed by the slave station to the slave station which has transmitted response data including a data flag indicating a change in the plurality of data only when the data flag included in the response data from the slave station in response to the command data indicates that the plurality of data managed by the slave station have changed.

BRIEF DESCRIPTION OF THE DRAWINGS

FIG. 4 is a block diagram showing a conventional data communication system;

FIGS. 5A and 5B are views showing the data formats of command data and response data used in the conventional system.

DESCRIPTION OF THE PREFERRED EMBODIMENT

Figure 1:
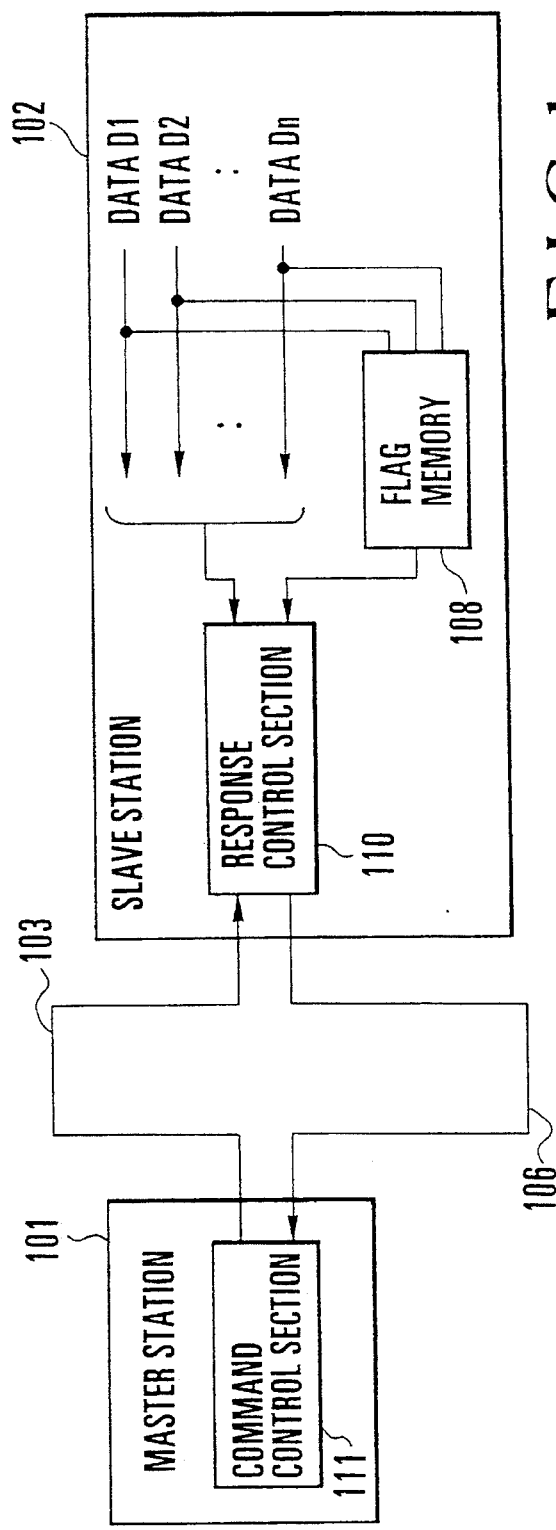
FIG. 1 is a block diagram showing a data communication system according to an embodiment of the present invention.

The present invention will be described below with reference to the accompanying drawings. FIG. 1 shows a data communication system according to an embodiment of the present invention, more specifically a system applied to a case wherein pieces of alarm information managed by slave stations are acquired in a master station. This alarm information is data indicating whether an alarm is generated. Data indicating the generation of alarms are monitored and accumulated in a slave station, and the master station is notified of the data by center polling.

Referring to FIG. 1, reference numeral 101 denotes a master station for transmitting command data 103 and receiving response data 106; and 102, a slave station for selectively transmitting a plurality of alarm data D1 to Dn, as response data 106, to the master station 101 in response to the command data 103 from the master station 101. The master station 101 includes a command control section 111 for transmitting the command data 103 including a command flag and controlling the command flag in the command data 103 in accordance with the state of a data flag included in response data from the slave station 102. The slave station 102 includes a flag memory 108 and a response control section 110. The flag memory 108 serves to store a data flag which is normally set in an OFF state and is set in an ON state in accordance with changes in the alarm data D1 to Dn. The response control section 110 transmits either the data flag stored in the flag memory 108 or the alarm data D1 to Dn, designated in accordance with the state of the command flag included in the master station 101 from the command control section 111 of the master station 101, to the command control section 111, together with the identification information of the slave station 102. The alarm data D1 to Dn are stored in a memory (not shown) or monitored, as needed.

Figure 2A:
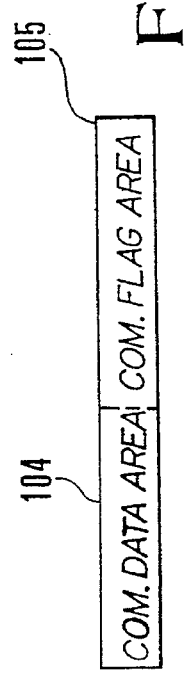
FIGS. 2A and 2B are views showing the data formats of command data and response data used in the data communication system in FIG. 1.
Figure 2B:
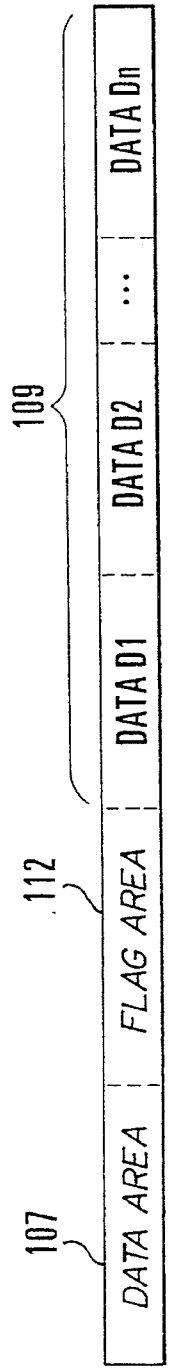

As shown in FIG. 2A, the command data 103 is constituted by a command data area 104 in which the identification information of the slave station 102 as a transmission destination is set, and a command flag area 105 in which a command flag designating processing in the slave station 102 is set. When this command flag is set in an OFF state, it indicates a request of only the data flag stored in the flag memory 108. When the command flag is set in ON state, it indicates a request to read out and transmit the alarm data D1 to Dn. As shown in FIG. 2B, the response data 106 is constituted by a response data area 107 in which the identification information of the slave station 102 as a transmission source is set, a data flag area 112 in which the data flag stored in the flag memory 108 is set, and a data area 109 in which the alarm data D1 to Dn are set.

Figure 3:
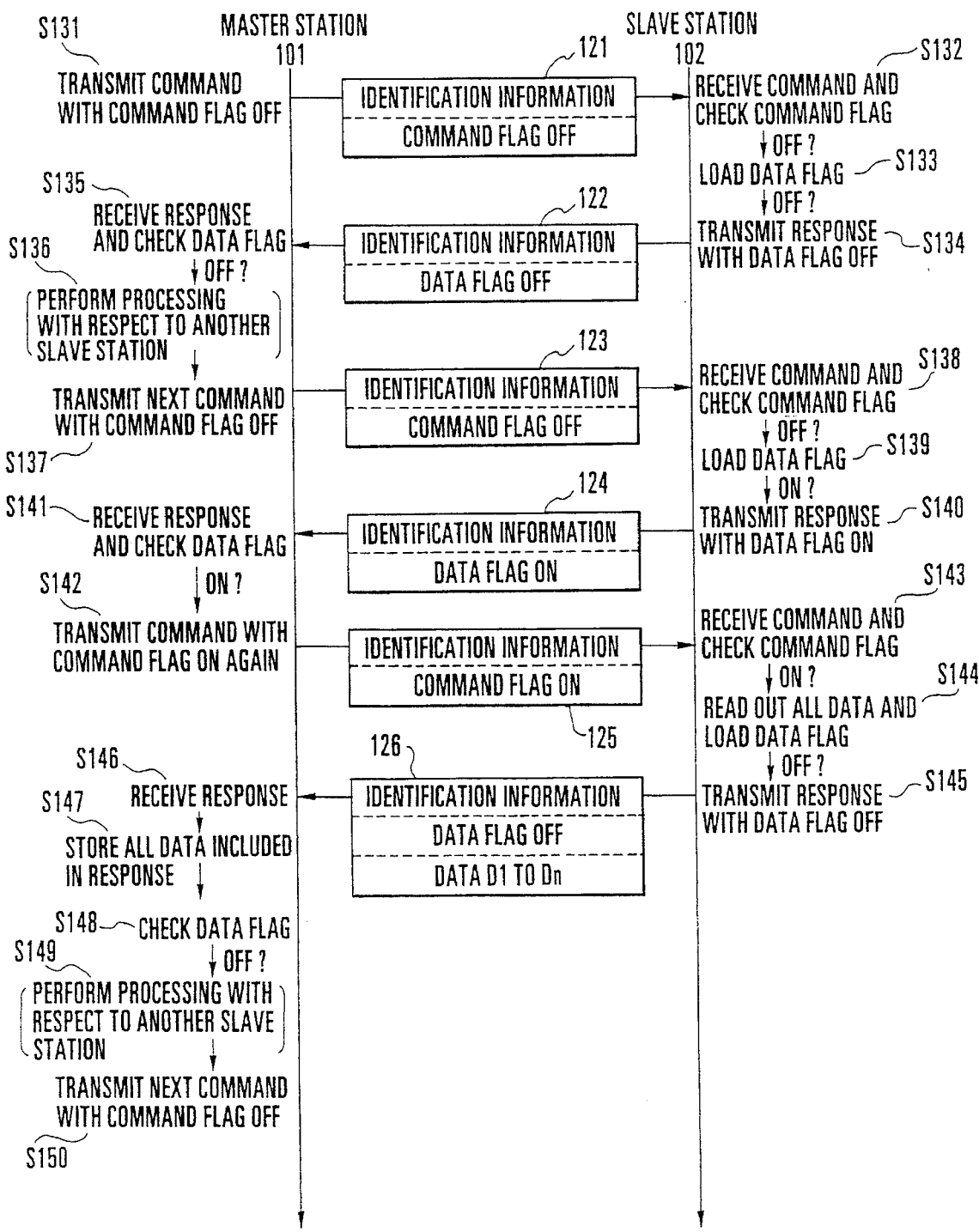
FIG. 3 is a view showing a sequence of data communication in the data communication system.
Figure 6:
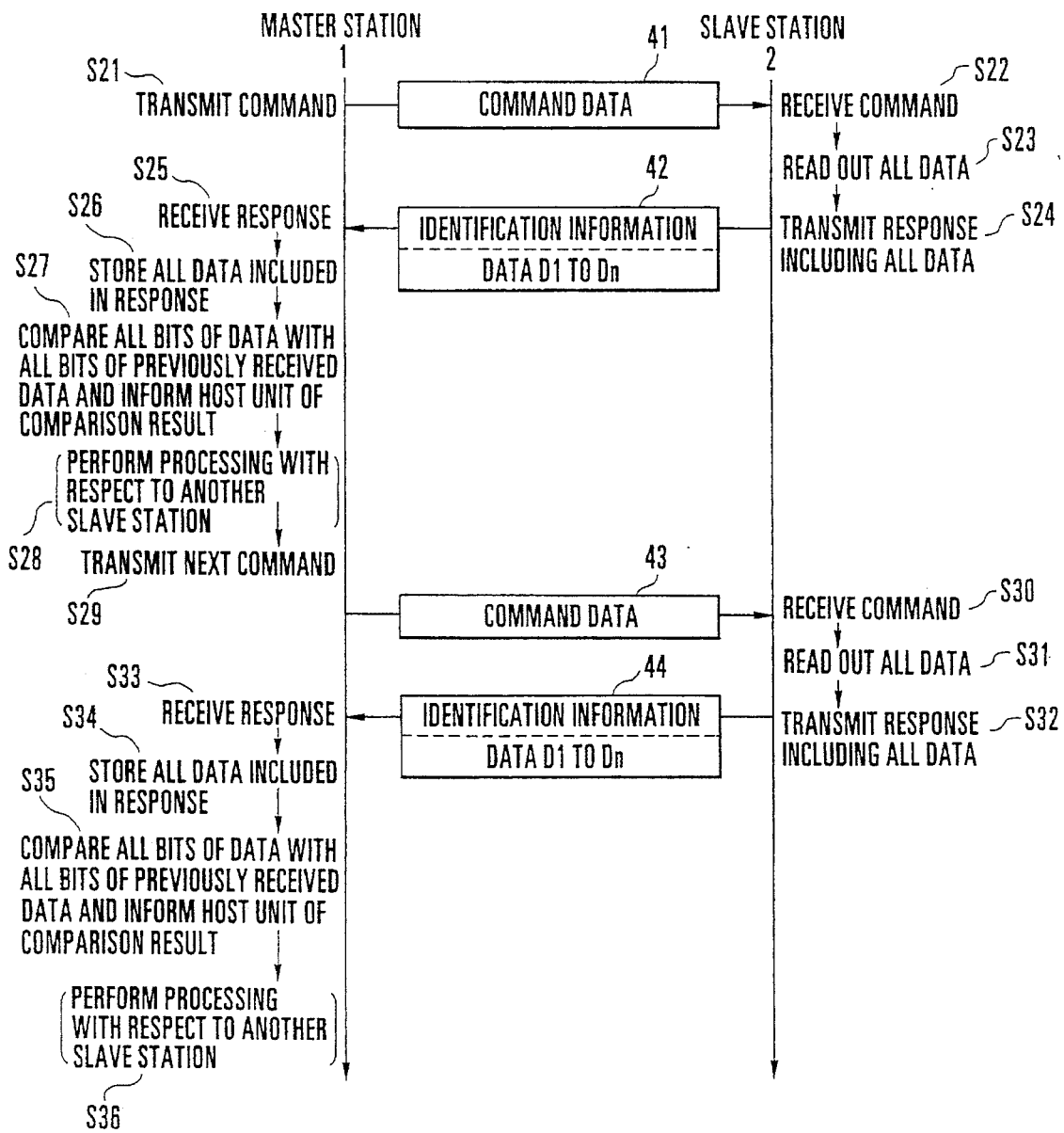
FIG. 6 is a view showing a sequence of data communication in the conventional system.

FIG. 3 shows a sequence for data communication between the master station 101 and the slave station 102. A data communication method according to the present invention will be described below with reference to FIG. 3.

Assume that the master station 101 wants to know changes in the alarm data D1 to Dn held by the slave station 102. In this case, the command control section 111 sets the identification information in the command data area 104 shown in FIG. 2A and transmits command data 121 having a command flag set in the command flag area 105 in an OFF state, as a command for designating a check on changes in alarm data, to the slave station 102 in accordance with an instruction from a host control section (not shown) in the master station 101 (step S131).

The response control section 110 of the slave station 102 determines the set state of the command flag in accordance with the command data 121 (step S132). If the command flag is OFF, the response control section 110 reads out the data flag from the flag memory 108 (step S133). If the alarm data D1 to Dn are kept unchanged, the data flag is kept OFF. This data flag is set in the data flag area 112 shown in FIG. 2B, and the identification information of the slave station 102 is set in the response data area 107. These pieces of information are then transmitted, as response data 122, to the master station 101 (step S134).

The command control section 111 of the master station 101 receives the response data 122 and determines the state of the data flag in the data (step S135). If this data flag is OFF, the command control section 111 performs processing with respect to another slave station (not shown) upon determining that the alarm data D1 to Dn in the slave station 102 have undergone no change (step S136).

At the processing timing with respect to the slave station 102 after the processing with respect to another slave station is completed, the command control section 111 of the master station 101 transmits command data 123 having a command flag set in an OFF state to the slave station 102, together with the identification information of the slave station 102, in the same manner as described above (step S137). The response control section 110 of the slave station 102 determines the state of the command flag in the command data 123 (step S138), and reads out the data flag from the flag memory 108 in accordance with the OFF state of the command flag (step S139). The response control section 110 then transmits the read data, as response data 124, to the master station 101, together with the identification information of the slave station 102 (step S140). If one of the alarm data D1 to Dn has undergone a change, the response data 124 including the data flag set in an ON state is transmitted from the slave station 102.

Upon reception of the response data 124, the command control section 111 of the master station 101 determines the state of the data flag (step S141). If this data flag is ON, the command control section 111 determines that one of the alarm data D1 to Dn has undergone a change, and transmits command data 125 having a command flag set in an ON state, together with the identification information of the slave station 102, to check the contents of the change in detail. With this operation, the command control section 111 instructs the slave station 102 to read out and transmit the alarm data D1 to Dn (step S142).

The response control section 110 of the slave station 102 determines the state of a command flag 5 upon reception of the command data 125 (step S143). In accordance with the ON state of the command flag, the response control section 110 reads out all the alarm data D1 to Dn in the home station, and sets the read data in the data area 109 of the response data 106 shown in FIG. 2B. In addition, the response control section 110 sets the data flag stored in the flag memory in the data flag area 112 (step S144), and transmits the data flag, as response data 126 including the identification information of the slave station 102 (step S145).

The command control section 111 of the master station 101 receives the response data 126 (step S146), and reads out and stores all the alarm data D1 to Dn from the data area 109 (step S147). Subsequently, in accordance with determination on the data flag (step S148), the command control section 111 performs processing with respect to another slave station (not shown) in the same manner as described above (step S149). If a command flag from another slave station is OFF, the command control section 111 transmits the command data 103 to the slave station 102 again to check the state of the data flag (step S150), and repeats either the processing in steps S132 to S135 or the processing in steps S138 to S149 on the basis of the state of the data flag.

As described above, a data flag indicating whether the contents of any of the data D1 to Dn in the slave station 102 have changed is stored in the flag memory 108, and the command control section 111 of the master station 101 transmits the command data 103 for designating a data flag read operation, in which the command flag is normally set in an OFF state. Only when the data flag included in the response data 106 transmitted from the slave station 102 in response to the command data 103 is set in an ON state to indicate a change in the data D1 to Dn, the command control section 111 transmits the command data 103, in which the command flag is set in an ON state again, to instruct the slave station 102 to read out the alarm data D1 to Dn. In response to this command data, the slave station 102 transmits the contents of the data D1 to Dn to the master station 101. With this operation, the amount of data communicated between the master station 101 and the slave station 102 in a normal operation can be greatly reduced to improve the data transfer efficiency. In addition, the processing loads on the master station and the slave station 102 can be reduced. Especially, a system for acquiring necessary data only when the contents of data such as alarm data have undergone a change can be realized without requiring a large communication capacity and a high processing ability.

What is claimed is:

1. A data communication system, comprising:

a master station; and a plurality of slave stations for transmitting/receiving data to/from said master station, for causing said master station to transmit command data to each slave station of said plurality of slave stations and causing said each slave station to transmit response data in response to the command data, each said slave station including:

a memory for storing a data flag indicating whether contents of a plurality of data managed by a home station have changed, and response control means for, when a command flag included in the command data from said master station designates transmission of the data flag, transmitting the data flag stored in said memory as response data, and for, when the command flag included in the command data from said master station designates transmission of a plurality of data managed by the home station, transmitting the plurality of designated data as response data, and said master station including:

command control means for transmitting the command data including the command flag for designating transmission of the data flag at first, and retransmitting the command data including the command flag for designating transmission of the plurality of data managed by said slave station to said slave station which has transmitted the response data including the data flag indicating a change in the plurality of data only when the data flag included in the response data from said slave station in response to the command data indicates that the plurality of data managed by said slave station have changed.

2. A system according to claim 1, wherein the command data from said master station includes identification information of said slave station as a transmission designation, and the response data from said slave station includes identification information indicating said slave station as a transmission source.

3. A system according to claim 2, wherein the command data from said master station has a command area in which the identification information indicating said slave station as the transmission designation is set, and a command flag area in which the command flag is set, and the response data from said response data has a response area in which the identification information indicating said slave station as the transmission source is set, a data flag area in which the data flag stored in said memory is set, and a data area in which the plurality of data managed by said slave station are set, the data flag area and the data area being selectively used.

4. A system according to claim 1, wherein the plurality of data managed by said slave station are a plurality of alarm data indicating whether an alarm is generated.

5. A data communication method comprising the steps of:

causing a master station to transmit command data including a command flag to each of a plurality of slave stations, the command flag designating transmission of a data flag indicating whether a plurality of data managed by a slave station of said plurality of slave stations have changed;

causing said slave station to transmit response data including the data flag to said master station in accordance with the command flag included in the received command data, the data flag indicating whether the plurality of data managed by a home station have changed;

causing said master station to transmit command data including the command flag to said slave station when the data flag included in the response data received from said slave station indicates that the plurality of data managed by said slave station have changed, the command flag designating transmission of the plurality of data managed by said slave station; and causing said slave station to transmit response data including the plurality of data managed by said home station to said master station in accordance with the command flag included in the command data.

6. A system according to claim 5, wherein the command data from said master station includes identification information indicating aid slave station as a transmission destination, and the response data from said slave station includes identification information indicating said slave station as a transmission source.

7. A method according to claim 6, wherein the command data from said master station has a command area in which the identification information indicating said slave station as the transmission designation is set, and a command flag area in which the command flag is set, and the response data from said response data has a response area in which the identification information indicating said slave station as the transmission source is set, a data flag area in which the data flag stored in said memory is set, and a data area in which the plurality of data management by said slave station are set, the data flag area and the data area being selectively used.

8. A method according to claim 5, wherein when the data flag included in the response data received from said slave station indicates that the plurality of data managed by said slave station have changed, said master station performs data communication processing including transmission of command data to a next slave station.

* * * * *